3,069,624
AUTOMATIC POWER TRIP SWITCH FOR A TRANSMITTER HAVING HIGH REFLECTIVE POWER
David S. Friedman, Nutley, N.J., assignor, by mesne assignments, to the United States of America as represented by the Secretary of the Air Force
Filed Mar. 14, 1961, Ser. No. 95,750
4 Claims. (Cl. 325—151)

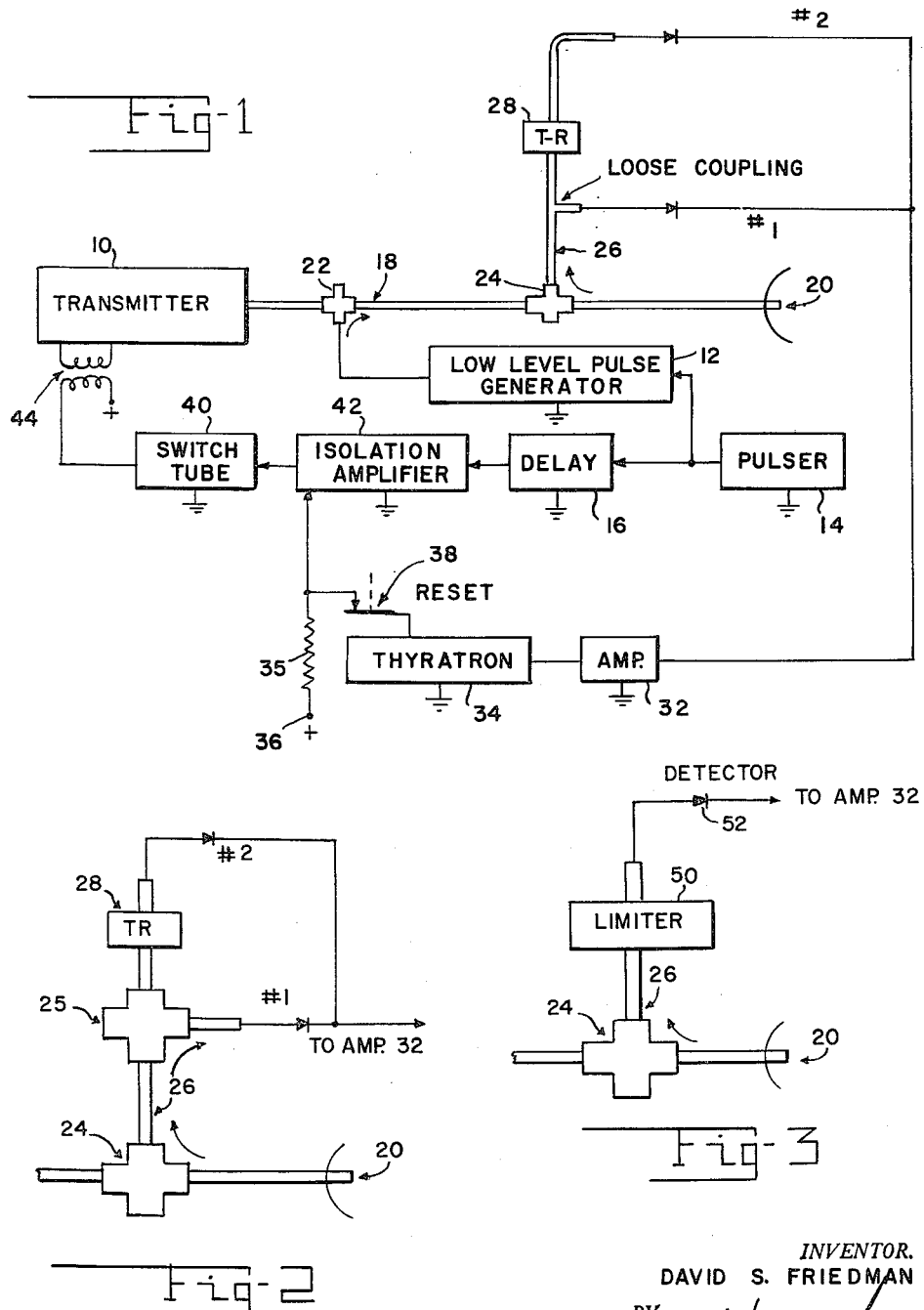

The invention relates to a protective device for a high power microwave source, and more particularly a switch which is capable of anticipating high reflected power and turning off the microwave source before the high power pulse is transmitted.

There occasionally occurs in the operation of a transmitter and antenna combination the condition in which the impedance of the transmitter does not match or equal the impedance of the antenna or connected load. The result is reflected power which, if in sufficient magnitude, is harmful to the transmitter.

It is thus an object of this invention to provide a protective device for a high power microwave source capable of anticipating high reflected power and turning off the source.

It is the specific object of this invention to provide a system wherein a low power test pulse is transmitted before the transmission of a high power pulse and employing the low power test pulse to prevent the transmission of the high power pulse in the event that the low power pulse indicates excessive reflection power.

Other objects, novel features, and advantages of this invention, will become apparent upon consideration of the embodiments illustrated in the accompanying drawings and hereinafter to be described.

In the drawing:
FIGURE 1 is a schematic of an embodiment of the novel automatic power trip switch;
FIGURE 2 is an illustration of a modification of the FIGURE 1 switch; and
FIGURE 3 is an illustration of a second modification of the FIGURE 1 switch.

As shown in FIGURE 1, the input signal from the transmitter 10 consists of two pulses. The earlier pulse is injected into the system by a low power test pulse transmitting means or low level pulse generator 12. A synchronizing signal generator or pulser 14 initiates the two pulses by triggering the low level pulse generator immediately and subsequently triggering the transmitter 10 after a short delay in delay line 16. The delayed pulse is applied to switch tube 40, through the isolation amplifier 42 causing the conduction of the switch tube 40. The conduction of switch tube 40 through pulse transformer 44 supplies the klystron high voltage to the transmitter 10.

The main transmission line 18, which can be a waveguide as illustrated in the drawing, carries both pulses to the antenna or load 20. The low level pulse enters the main transmission line at a first directional coupler 22 constructed such that the energy flow from the low pulse generator will be directed toward the load 20. A second directional coupler 24 is located in the main transmission line between the first directional coupler and the antenna for coupling the main transmission line 18 with branch transmission line 26. The second directional coupler is constructed such that only reflected energy coming from the antenna 20 will flow into the branch transmission line 26.

The FIGURE 1 circuit is designed so that the detector in trigger circuit #1 is very loosely coupled to branch line 26, while diode #2 is strongly coupled thereto. A portion of the low level monitor pulse is first reflected from the load 20, and coupled to line 26 via coupler 24. Since this signal is much weaker than the main pulse, and since trigger circuit #1 is loosely coupled to line 26, tap #1 is insensitive to the monitor pulse, but tap #2 will be activated by this pulse in the presence of large reflections.

Should the monitor pulse fail to activate the trip switch, the main pulse will be transmitted, and a portion thereof will eventually enter line 26 via reflections from load 20 and coupler 24. The design is such that the TR tube will fire, protecting the detector in tap #2 from burn-out due to excessive power. This signal, much stronger than that from the monitor pulse, will activate the trip switch via trigger circuit #1.

The reflected power pulses from taps #1 and #2 are applied to amplifier 32. The amplifier output pulse is in turn applied to radio frequency fault thyratron 34. Under normal operation, where the reflected power pulse is low, the thyratron will not ionize and the isolation amplifier plate voltage will remain at the high positive value set by voltage source 36 and resistance 35. However, if the pulse is of sufficient amplitude that such reflected power pulses would be harmful to the transmitter, the thyratron 34 fires dropping the plate voltage of the isolation amplifier to very close to ground potential. Loss of this voltage disables the isolation amplifier, thus stopping the conduction of the switch tube 40 and the supply of high voltage to the transmitter 10. The thyratron is cut off and the circuit brought back to normal operation by means of reset switch 38.

FIGURE 2 illustrates another possible embodiment of the same principle. Reflected power from load 20 again enters line 26 via coupler 24. Tap #1 is loosely coupled to line 26 via coupler 25, and is again insensitive to the monitor pulse. The monitor pulse will activate detector #2, as before, while the main pulse activates detector #1, as before. The TR tube again protects detector #2 against burn-out.

Still another possible embodiment is shown in FIGURE 3, which requires the use of only one detector 52. The limiter 50 will sharply attenuate high level signals, but transmits low level signals with substantially no loss. Thus the monitor signal will pass unaffected through the limiter while the main pulse signal is sharply attenuated. The detector is thus sensitive to both signals, while the limiter protects it from being burnt out by the high level signal.

The anticipatory circuit keeps the transmitter from operating into a harmful environment under most conditions. However, if for any reason the low-level signal failed to turn off the source, the reflected main pulse would accomplish the desired result.

The invention is not intended to be limited to the examples of embodiments shown and described but may, on the contrary, be capable of many modifications without departing from the spirit of the invention.

I claim:
1. An automatic power trip switch for preventing anticipated high reflective power from an antenna to its transmitter from reaching the transmitter comprising means for applying power to said transmitter, a main transmission line between said transmitter and said antenna, means for transmitting a low power test pulse through said main transmission line at a predetermined time prior to the transmission of each high power pulse from the said transmitter, and means responsive to excessive reflected power from said low power test pulse for turning off said power applying means thereby preventing the transmission of a high power pulse.

2. An automatic power trip switch for preventing anticipated high reflective power from an antenna to its transmitter from reaching the transmitter comprising means for applying power to said transmitter, a low level pulse generator having its output coupled to said antenna through first and second directional couplers being positioned in the order named in the main transmission line between said transmitter and said antenna, a synchronizing signal generator having its output coupled to said pulse generator and said transmitter through a delay line, a branch transmission line connected to said second directional coupler, said second directional coupler being constructed such that only reflections from said antenna will pass through said branch transmission line, and means for sampling said reflections in said branch transmission line and for turning off said power applying means when the low level pulse is reflected to the extent that if the transmitter were to operate in this environment the reflections would be harmful to the said transmitter.

3. An automatic power trip switch for preventing anticipated high reflective power from an antenna to its transmitter from reaching the transmitter comprising means for applying power to said transmitter, a low level pulse generator having its output coupled to said antenna through first and second directional couplers, said directional couplers being positioned in the order named in the main transmission line between said transmitter and said antenna, a synchronizing signal generator having its output coupled to said pulse generator and said transmitter through a delay line, a branch transmission line having first and second taps in the order named from the said main transmission line connected to said main transmission line at said second directional coupler, said second directional coupler being constructed such that only reflections from said antenna will pass through said branch transmission line, said first tap being loosely coupled to said branch transmission line, a transmit-receive switch positioned in said branch transmission line between said taps for preventing the reflected power from the main pulse from reaching said second tap and allowing the reflected power from the low level pulse to reach said second tap, and means connected to said taps for turning off said power applying means when a pulse is reflected to the extent that if the transmitter were to operate in this environment the reflections would be harmful to the said transmitter.

4. An automatic power trip switch for preventing anticipated high reflective power from an antenna to its transmitter from reaching the transmitter comprising means for applying power to said transmitter, a low level pulse generator having its output coupled to said antenna through first and second directional couplers, said directional couplers being positioned in the order named in the main transmission line between said transmitter and said antenna, a synchronizing signal generator having its output coupled to said pulse generator and said transmitter through a delay line, a branch transmission line connected to said main transmission line at said second directional coupler, said second directional coupler being constructed such that only reflections from said antenna will pass through said branch transmission line, a limiter connected to said branch transmission line for sharply attenuating high reflective power pulses and transmitting low level pulses with substantially no loss, and means connected to said limiter for turning off said power applying means when a pulse is reflected to the extent that if the transmitter were to operate in this environment the reflections would be harmful to the said transmitter.

References Cited in the file of this patent

UNITED STATES PATENTS

| | | |
|---|---|---|
| 2,498,719 | Spencer | Feb. 28, 1950 |
| 2,679,595 | Spencer | May 25, 1954 |